United States Patent [19]

Fredriksen

[11] Patent Number: 4,812,978
[45] Date of Patent: Mar. 14, 1989

[54] DATA PROCESSING METHOD, PREFERABLY FROM SEISMIC STREAMERS

[75] Inventor: Paul Fredriksen, Asker, Norway

[73] Assignee: Geophysical Company of Norway A.S., Sandvika, Norway

[21] Appl. No.: 874,634

[22] Filed: Jun. 16, 1986

[30] Foreign Application Priority Data

Jun. 17, 1985 [NO] Norway .................. 852447

[51] Int. Cl.⁴ ............................................ G01V 1/28
[52] U.S. Cl. ..................................................... 364/421
[58] Field of Search ................................. 364/421–422, 364/414; 367/38, 58

[56] References Cited

U.S. PATENT DOCUMENTS

| | | |
|---|---|---|
| 3,400,783 | 9/1968 | Lee .................... 367/58 |
| 3,496,528 | 2/1970 | Brey . |
| 4,178,510 | 12/1979 | Wagner ............... 364/414 |
| 4,594,662 | 6/1986 | Devaney .............. 364/400 |
| 4,654,796 | 3/1987 | Takagi ................. 364/414 |
| 4,682,290 | 7/1987 | Tan ..................... 364/414 |

FOREIGN PATENT DOCUMENTS 0070169 1/1983 European Pat. Off. .
2013064 8/1979 United Kingdom .
2120898 12/1983 United Kingdom .
2134259 8/1984 United Kingdom .
2149261 6/1985 United Kingdom .

Primary Examiner—Jerry Smith
Assistant Examiner—Gail O. Hayes
Attorney, Agent, or Firm—Holman & Stern

[57] ABSTRACT

A method for the reduction of data logging in seismic data processing, in which data are transmitted between a plurality of data acquisition devices with a plurality of channels and a central receiving and recording device by using a plurality of transmission modules each of which is essentially allocated to a date acquisition device and each channel is assigned corresponding seismic traces comprises, providing real physical seismic traces and synthetic seismic traces, inserting the synthetic traces between the real traces, locating the seismic traces with relative uniform, physical distance, assigning corresponding simulated channels to the synthetic traces, assigning to each simulated channel an estimate of the real value for a corresponding physical channel, and adapting each estimated value to the values of at least one adjacent physical channel assigned the corresponding real physical traces.

6 Claims, 2 Drawing Sheets

\* \* \* \* \* \* \* \* \* \* \* \*
1 2 3 4 5 6 7 8 9 10 11 12

\* \* \* \* \*   \* \* \* \* \* \* \*
1 2 3 4 5   6 7 8 9 10 11 12

DATA PROCESSING METHOD, PREFERABLY FROM SEISMIC STREAMERS

BACKGROUND OF THE INVENTION

1. Field of the Invention

The present invention relates to a data processing method whereby data are transmitted between a plurality of acquisition means with a plurality of channels and a central receiver and recording device, using a plurality of transmission modules, each of which is essentially allocated a corresponding data acquisition means.

The present invention is principally intended for use in connection with marine seismic surveys. However, it is to be understood that the method may be applied to seismic data processing in general; e.g., also for processing of data collected in connection with onshore seismic surveys.

For simplicity's sake, however, the present invention is to be described by the example of its application in a marine, seismic system.

2. Description of the Prior Art

In marine seismic surveys there is used a seismic vessel which is steered along specific survey lines of the area to be explored for possible hydrocarbon deposits or the like, while a so-called seismic streamer cable which may have a length of several kilometers, is towed through the sea behind the vessel. Behind the vessel there are also towed means for generating sound waves which are transmitted towards the seabed. The sound waves are reflected from the seabed and strata beneath it and are received by sensitive hydrophones arranged along the seismic streamer.

A group of hydrophones (or geophones) forms part of a so-called seismic data acquisition means; and the analogue measurements from the several sensors are transmitted through measuring channels and digitized in modules which are located adjacent to the acquisition means. The digital data are then transmitted by a digital transmission system to the central receiver and recording means.

As a response to the desire of having a denser spatial sampling within the field of marine seismics, an increasing number of channels are now used for transmitting the reflection signals returned to the streamer by the several sensors which are connected to just as many measuring channels. The number of channels used are rapidly increasing in order to improve the resolution and the information content of the total survey.

The reflection signals in the form of digital signals which are fed to large computers for processing on board the seismic vessel, represent a great volume of information. In connection with the use of an increasing number of channels it has thus been shown necessary to apply a "data reduction" method in order to avoid overflowing the processing centers with data.

It is, however, important when using data reduction that there is a fixed geometry as regards the channels, i.e. a uniform distance between each channel.

In certain cases it is practically impossible physically to maintain a fixed geometry, i.e. because there are used certain defined types of equipment in the streamer, e.g. large compasses, which demand a great deal of space.

SUMMARY OF THE INVENTION

The present invention has as its objective to alleviate the inconvenience caused by a non-uniform spatial distribution of the channels in a streamer.

The problem is solved by the method of the invention characterized in that the data stream transmitted between the data acquisition means and the central receiver and recording means, is provided with data values which simulate one or several channels of an intended location that achieves a uniform geometry between the channels.

In other words, in the data stream there are inserted one or several extra channels assigned a synthetic value which may simultate the missing channel or channels that restore a uniform geometry between all the channels.

Preferably the synthetic channel is assigned an estimate of the real value of a corresponding physical channel, as the estimated value is adapted to values from the adjacent channel.

A data reduction may now be performed on the data stream containing synthetic channels, based on uniform geometry between the channels and against values which do not introduce errors in the data transmitted to the processing center.

The value of a Synthetic Trace can be determined according to the following different options selected by an operator of the system:

(1) Zero Trace.

With this option the Synthetic Trace is filled with zero numeric value.

(2) Previous Trace.

With this option the Previous Trace is copied into the Synthetic Trace over all the Scans of the shot file giving two identical Traces. If the first Trace is a Synthetic Trace it is filled with zero numeric value.

(3) Next Trace.

With this option the Next Trace is copied into the Synthetic Trace over all the Scans of the shot file giving two identical Traces. If the last Trace is a Synthetic Trace it is filled with zero numeric value.

(4) Linear Interpolation.

With this option the Synthetic Trace is calculated as the average of the previous and the Next Trace over all the Scans of the shot file. If the First/Last Trace is a Synthetic Trace it is filled with half the Last/Previous Trace, respectively.

The invention will in the following be described in greater detail with reference to the figures of the accompanying drawings illustrating an example of an embodiment of the present invention.

DETAILED DESCRIPTION

Figures 1, 3, 4:
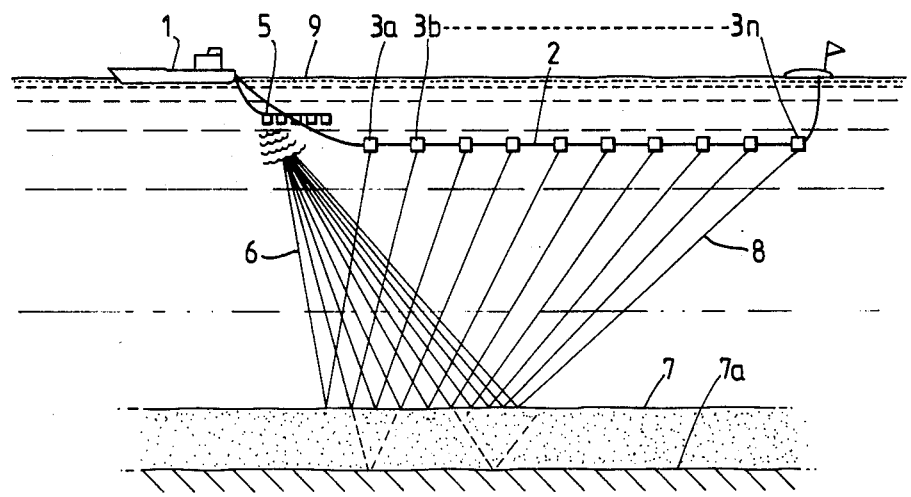
FIG. 1 is a sketch giving a general view of a marine seismic system, wherein the present invention is employed.
FIG. 3 is a sketch illustrating a uniform spatial distribution of measuring points or channels.
FIG. 4 is a sketch which illustrates a non-uniform spatial location of measuring points or channels.

Referring now to FIG. 1, which is an overview of a marine seismic system wherein the present invention may be used, 1 designates a sea-going vessel which tows a seismic streamer 2 comprising a plurality of magnetic hydrophone arrays 3a, 3b, . . . 3n, arranged spaced apart along the streamer 2.

The seismic streamer 2 may also comprise a plurality of magnetic compasses (not shown) which are arranged spaced apart along the streamer. Behind the vessel 1 a seismic source 5 is also towed, for instance an array of air guns which according to a specific procedure emit sound waves 6 towards the seabed 7 and the different geological strata 7a beneath the seabed 7. The seabed 7 and the strata 7a reflect the sound waves 6 in the form of reflection waves 8 which in their turn are received by the hydrophone arrays 3a, 3b, . . . 3n, preferably as analogue signals which are converted to digital ones and transmitted to the seismic vessel 1 for further processing.

Figure 2:
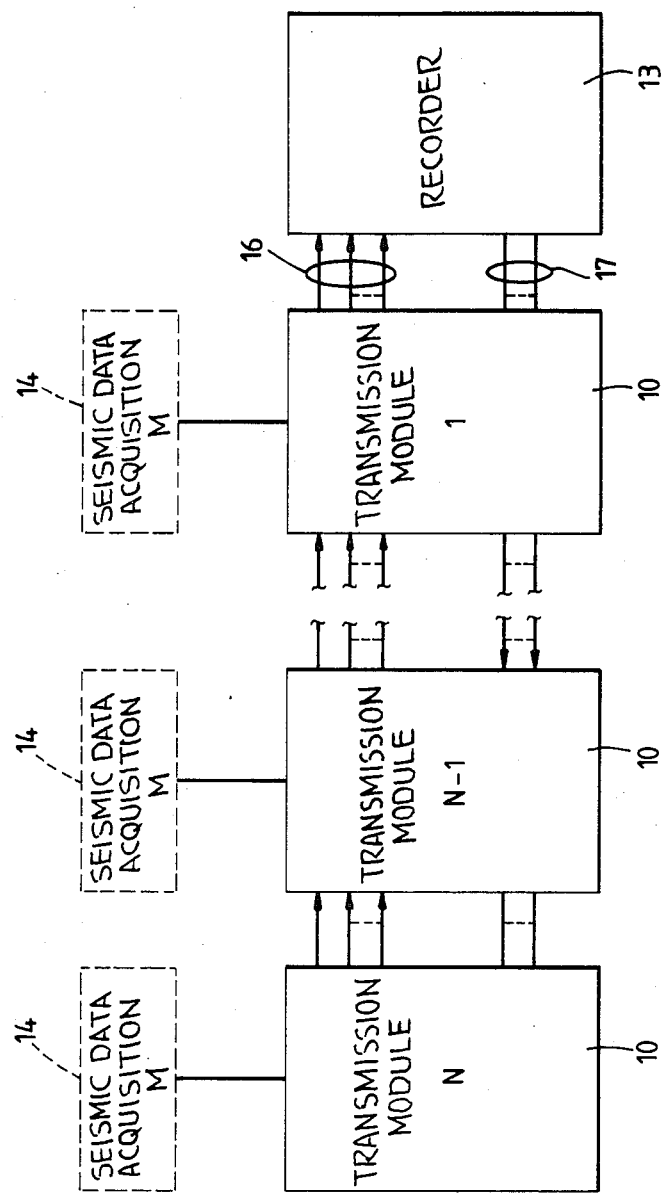
FIG. 2 is schematic block diagram of a data acquisition and transmission system of a seismic streamer.

FIG. 2 shows a number N of transmission modules 10 transmitting data from the associated data acquisition means 14, to a central receiver and recording means 13, as the transmission of the data are taking place through a plurality of transmission lines 16. There is also connected a plurality of outgoing transmission lines 17 from the receiver and recording means 13, transmitting beat information and instructions controlling the data acquisition and transmission process during normal and abnormal operation.

Each of the seismic data acquisition means 14 comprises an array of hydrophones (or geophones), outputting data in the form of analogue signals. Each seismic data acquisition means 14 is designed with a certain number of channels, for instance M and if there are used N data acquisition means 14, it is necessary to use M×N data channels for transmission of the signals received by the hydrophones or sensors which are configured as the said number of measuring channels.

The seismic measurements are thus initially based on recording signals from a plurality of measuring channels or traces located sequentially within the streamer, the channels being arranged equidistant between the midpoint of each channel or trace. At certain moments of time, e.g. every second millisecond, the value of each channel is read and recorded as a sequence of data values. If it previously is a uniform distance between the midpoints of each channel, the measuring points' spatial extension may be illustrated schematically as seen in FIG. 3.

As the measuring points have a spatial uniform distribution along the streamer, the following data stream results:
value of channel$_1$
value of channel$_2$
value of channel$_3$
value of channel$_4$
value of channel$_5$
value of channel$_6$
value of channel$_7$
value of channel$_8$
value of channel$_9$
value of channel$_{10}$
value of channel$_{11}$
value of channel$_{12}$ However, not only the value of the received signal is of interest, but also the mutual position of the channels, as this is the position that provides the spatial information in additio to the actual measurement values.

In certain cases, however, it is physically impossible to locate all measuring points or channels at uniform geographic distance. The arrangement of the measuring points may then look like that shown in FIG. 4, where it is indicated that the distance between channel 5 and 6 is greater than the mutual distance between the other channels.

This non-uniform location of measuring points is still providing a data stream as given above, namely:
value of channel$_1$
value of channel$_2$
value of channel$_3$
value of channel$_4$
value of channel$_5$
value of channel$_6$
value of channel$_7$
value of channel$_8$
value of channel$_9$
value of channel$_{10}$
value of channel$_{11}$
value of channel$_{12}$ The layout of a Shot-File is indicated in the figure below.

The Shot-File starts with Start-of-Information words and ends with End-of-Information words. The Header data and Seismic data can vary in length.

The Header data contains general information about the Shot-File.

The Seismic data are divided into Scans of equal length. This is shown in the figure below.

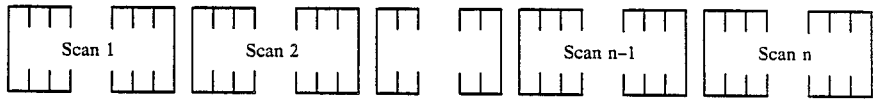

One Scan contains values from all the Auxiliary and Seismic Channels sampled at the same time. There is one Scan for each sampling time. One Trace is given by corresponding values over all the Scans. A trace gives the signal received on the corresponding Channel for the entire recording period. The figure below shows the layout of one Scan wherein "S" designates Sync-Time.

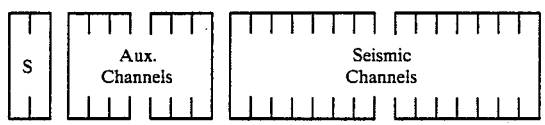

Each data word in the Shot-File has the following format:

| 4 | 3210 | 98765432109876543210 | Bit number. |
|---|------|----------------------|-------------|
| p | tttt | dddddddddddddddddddd | Data contents. | where:
p is a parity bit for odd parity.
ttt is a 4-bit tag.
d (19:0) is the data contents.

The data type is indicated by the 4-bit tag value. There are thus up to 16 different data types including the data types indicated above, e.g. Start-of-Information, Auxiliary data or Seismic data.

A Synthetic Trace is introduced as an additional Seismic Channel in each Scan. The position of the Synthetic Trace is specified by an operator of the seismic system at a position corresponding to the gap in the data Channel intervals. The Synthetic Trace is recognized by a 4-bit tag value designating Synthetic Trace.

In order to carry out data reduction it is important that there is a fixed geometry as regards the measuring points, i.e. over the distance between each channel. In connection with a location of the measuring points as shown in FIG. 4, which for instance may be caused by the use of a certain type of space-demanding equipment in the cable, e.g. large compasses, one will notwithstanding, according to the invention, try to achieve a uniform geometry between the measuring points, for example by synthetically providing space corresponding to the space one or several further channels may have used. Consequently, a synthetic measuring point may be inserted as it if were a physical measuring point, with the consequence that an extra channel is inserted in the data stream, which channel has a synthetic value simulating the missing channel and restoring uniform geometry. The valaues of the data stream will then again reflect the geography in addition to the values themselves. The data stream may then look like:

value from measuring point$_1$
value from measuring point$_2$
value from measuring point$_3$
value from measuring point$_4$
value from measuring point$_5$
synthetic value
value from measuring point$_6$
value from measuring point$_7$
value from measuring point$_8$
value from measuring point$_9$
value from measuring point$_{10}$
value from measuring point$_{11}$
value from measuring point$_{12}$ This data stream is stored and transmitted to the data processing means according to the following tabulation:
value of channel$_1$
value of channel$_2$
value of channel$_3$
value of channel$_4$
value of channel$_5$
value of channel$_6$
value of channel$_7$
value of channel$_8$
value of channel$_9$
value of channel$_{10}$
value of channel$_{11}$
value of channel$_{12}$
value of channel$_{13}$ Channel 6 is now a synthetic trace, and a uniform geographical distance between the channels is reestablished.

Different algorithms may be used to compute the value of the synthetic trace, and usually the measuring values for one or several channels on each side of the synthetic trace are used.

With the new data stream it is possible to apply data reduction on uniform geometry and against values which do not introduce errors in the data transmitted to the processing center.

It is to be understood that the same method may be used if a channel is disconnected due to some error ("killed traces") and because of singular data values detected as erroneous because of transmission errors in the digital system. Such a switching of synthetic traces may take place either manually or automatically according to the operator's wishes.

What I claim is:

1. A method for the reduction of data logging in seismic data processing, in which data are transmitted between a plurality of data acquisition means with a plurality of channels and a central receiving and recording means, by using a plurality of transmissions modules each of which is essentially allocated to a data acquisition means and each channel is assigned corresponding seismic traces comprising:
   providing real physical seismic traces and synthetic seismic traces;
   inserting the synthetic traces between the real traces;
   locating the seismic traces with relative uniform, physical distance;
   assigning corresponding simulated channels to the synthetic traces;
   assigning to each simulated channel an estimate of the real value for a corresponding physical channel; and
   adapting each estimated value to the values of at least one adjacent physical channel assigned the corresponding real physical traces.

2. The method as claimed in claim 1 and further comprising:
   replacing channels which are disconnected due to some error, or singular data values detected as erroneous, with simulated channels with data values based on estimates whose values are adapted data values from at least one adjacent channel.

3. The method as claimed in claim 2 wherein:
   the data reductions are performed on transmitted data which include the estimates of the simulated channels; and
   basing the data reduction on the uniform physical distance between the channels and performed against values which do not introduce errors in the data which are to be processed.

4. The method as claimed in claim 2 wherein said at least one adjacent channel comprises a plurality of adjacent channels.

5. The method as claimed in claim 1 wherein:
the data reductions are performed on transmitted data which include the estimates of the simulated channels; and further comprising
basing the data reduction on the uniform physical distance between the channels and performed against values which do not introduce errors in the data which are to be processed.

6. A method as claimed in claim 1 wherein said step of adapting each estimated value to values from at least one adjacent physical channel comprises adapting each estimated value to values from a plurality of adjacent physical channels.

* * * * *